(12) United States Patent
Chiu et al.

(10) Patent No.: US 9,331,569 B1
(45) Date of Patent: May 3, 2016

(54) CURRENT GENERATING CIRCUIT, CURRENT GENERATING METHOD, CHARGE PUMPING CIRCUIT AND CHARGE PUMPING METHOD

(71) Applicant: MEDIATEK INC., Hsin-Chu (TW)

(72) Inventors: Wei-Hao Chiu, Taichung (TW); Ang-Sheng Lin, Kaohsiung (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/596,238

(22) Filed: Jan. 14, 2015

(51) Int. Cl.
*H03L 7/06* (2006.01)
*H02M 3/07* (2006.01)

(52) U.S. Cl.
CPC ...................................... *H02M 3/07* (2013.01)

(58) Field of Classification Search
CPC ....... H02M 3/07; H03L 7/0891; H03L 7/0895
See application file for complete search history.

(56) References Cited

U.S. PATENT DOCUMENTS

| | | | |
|---|---|---|---|
| 5,898,336 A * | 4/1999 | Yamaguchi | H03L 7/0895 327/147 |
| 7,492,197 B2 * | 2/2009 | Lin | H03L 7/0895 327/157 |
| 7,514,985 B2 * | 4/2009 | Chang | H03L 7/0896 327/157 |

OTHER PUBLICATIONS

H. Hedayati et al., "A3 GHz Wideband ΣΔ Fractional-N Synthesizer With Switched-RC Sample-and-Hold PFD", Sep. 2012, pp. 1681-1690, vol. 20, No. 9, IEEE Transactions on Very Large Scale Integration (VLSI) Systems, CA, USA.
Salvatore Levantino et al., A Wideband Fractional-N PLL With Suppressed Charge-Pump Noise and Automatic Loop Filter Calibration, Oct. 2013, pp. 2419-2429, vol. 48, No. 10, IEEE Journal of Solid-State Circuits, Milan, Italy.

* cited by examiner

*Primary Examiner* — Jeffrey Zweizig
(74) *Attorney, Agent, or Firm* — Winston Hsu; Scott Margo

(57) ABSTRACT

A current generating circuit, which comprises: a first capacitor, comprising a first terminal and a second terminal; a second capacitor, comprising a first terminal and a second terminal; a first charge adjusting path, arranged for adjusting charges of the first capacitor according to a first charge adjusting voltage; a second charge adjusting path, arranged for adjusting charges of the second capacitor according to the first charge adjusting voltage; and a current generating path, coupled to the first capacitor and the second capacitor, arranged for generating a target current based on a difference between a first voltage provided by the first capacitor and a second voltage provided by the second capacitor.

21 Claims, 15 Drawing Sheets

CURRENT GENERATING CIRCUIT, CURRENT GENERATING METHOD, CHARGE PUMPING CIRCUIT AND CHARGE PUMPING METHOD

BACKGROUND

The present application relates to a current generating circuit/method and a charge pumping circuit/method, and particularly relates to a current generating circuit/method that can substitute a conventional current generating circuit/method and a charge pumping circuit/method applying the current generating circuit/method.

FIG. 1A is a diagram of a conventional charge pumping circuit 100. The conventional charge pumping circuit 100 includes a pull up circuit 101 and a pull down circuit 102, and both of the circuits are used to adjust a control voltage V_CT there between. The control voltage V_CT is further used as an output voltage of the conventional charge pumping circuit 100, and it may be applied to other external circuits (ex. coupled to a capacitor for providing a desired voltage).

FIG. 1B is a schematic diagram illustrating a narrow head room issue for a conventional charge pumping circuit 100. Since the control voltage V_CT directly affects the operation states of transistors in the pull up circuit 101 and the pull down circuit 102, the control voltage V_CT should be limited within a specific operating range so as to make the transistors operate in an appropriate work mode, such as a saturation mode. Generally, if the conventional charge pumping circuit 100 operates between a high predetermined voltage V_DD (ex. a supplying voltage) and a low predetermined voltage V_SS (ex. a ground voltage) and each transistor therein has an overdrive voltage V_OV, the control voltage V_CT should be limited by an upper boundary, which is the high predetermined voltage V_DD minus the overdrive voltage V_OV, and a lower boundary, which is the low predetermined voltage V_SS plus the overdrive voltage V_OV. In other words, the operating range of the control voltage V_CT is substantially equal to the high predetermined voltage V_DD minus two times the overdrive voltage V_OV (i.e. V_DD−2×V_OV), and it is extremely narrow and not suitable for some circuit applications. Such issue is called a narrow head room issue.

Either the pull up circuit 101 or the pull down circuit 102 comprises a current source to provide a current. However, such current sources may generate noises. One method for reducing the noise is increasing the overdrive voltage V_OV. However, such mechanism can make the narrow head room issue worse.

SUMMARY

One objective of the present application is to provide a current generating circuit/method that has low noise.

Another objective of the present application is to provide a charge pumping circuit/method applying a current generating circuit/method with low noise.

One embodiment of the present application discloses a current generating circuit, which comprises: a first capacitor, comprising a first terminal and a second terminal; a second capacitor, comprising a first terminal and a second terminal; a first charge adjusting path, arranged for adjusting charges of the first capacitor according to a first charge adjusting voltage; a second charge adjusting path, arranged for adjusting charges of the second capacitor according to the first charge adjusting voltage; and a current generating path, coupled to the first capacitor and the second capacitor, arranged for generating a target current based on a difference between a first voltage provided by the first capacitor and a second voltage provided by the second capacitor.

Another embodiment of the present application discloses a charge pumping circuit, which comprises an output terminal and a current generating circuit. The current generating circuit comprises: a first capacitor, comprising a first terminal and a second terminal; a second capacitor, comprising a first terminal and a second terminal; a first charge adjusting path, arranged for adjusting charges of the first capacitor according to a high predetermined voltage; a second charge adjusting path, arranged for adjusting charges of the second capacitor according to the high predetermined voltage; and a current generating path, coupled to the first capacitor the second capacitor and the output terminal, arranged for generating a target current based on a difference between a first voltage provided by the first capacitor and a second voltage provided by the second capacitor.

A current generating method and a charge pumping method can be acquired based upon above-mentioned embodiments. Detail descriptions thereof are omitted for brevity here.

In view of above-mentioned embodiments, a current generating circuit applying capacitors to generate currents is applied to substitute the conventional current source. Accordingly, the noise of the current source can be suppressed such that a large overdrive voltage is no longer needed. By this way, a wide head room for the current generating circuit can be provided.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
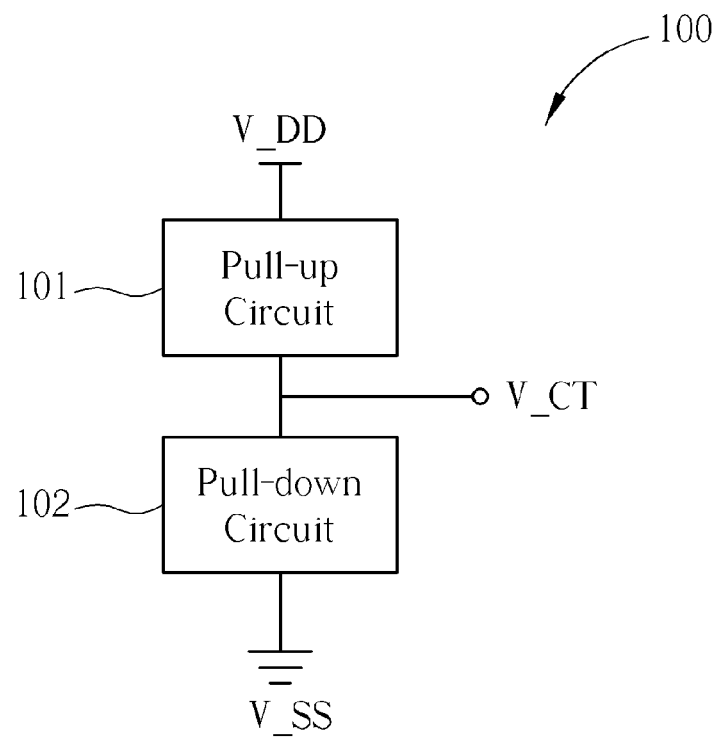
FIG. 1A is a circuit diagram illustrating a conventional charge pumping circuit.
Figure 1B:
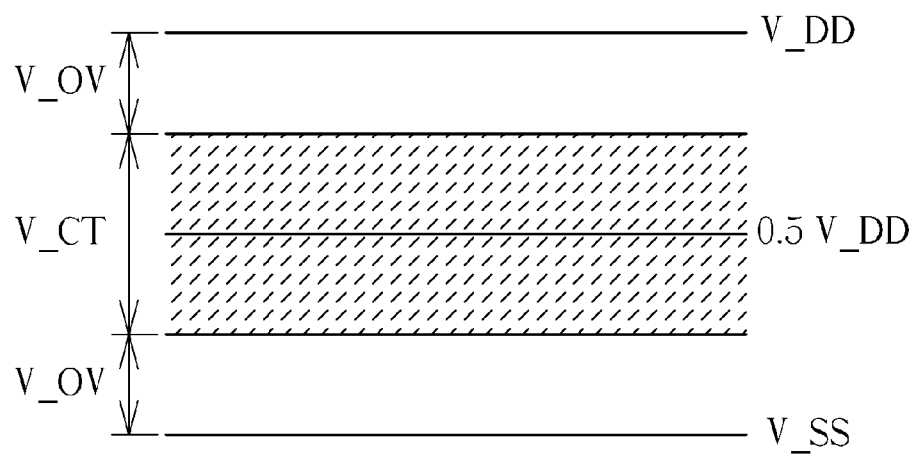
FIG. 1B is a schematic diagram illustrating a narrow head room issue for a conventional charge pumping circuit.
Figure 2:
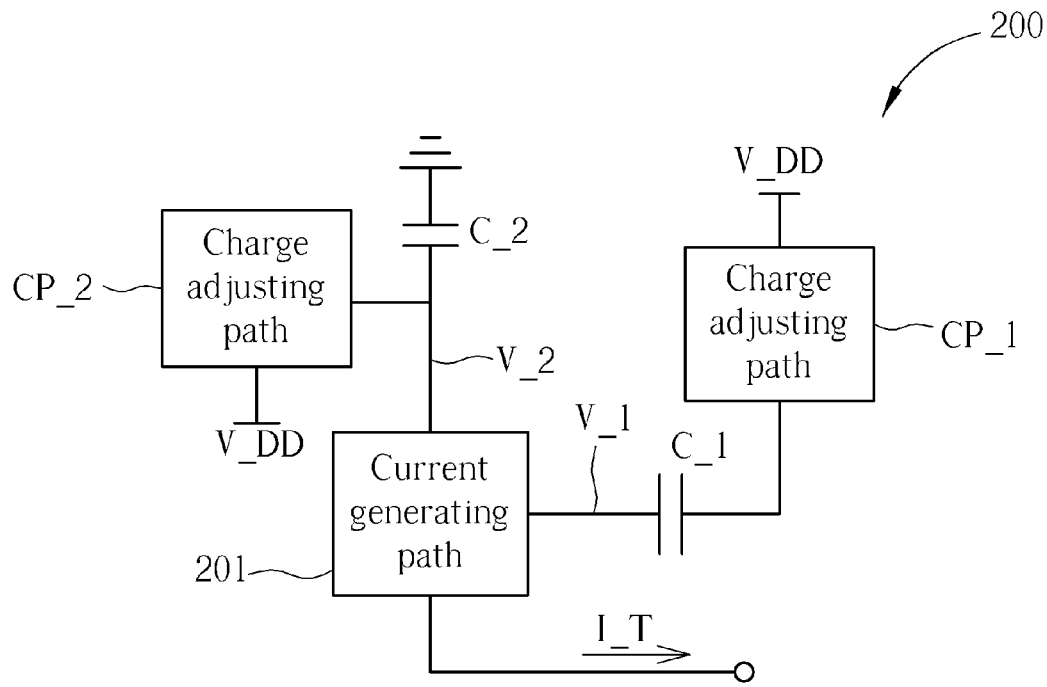
FIG. 2 is a block diagram illustrating a current generating circuit according to one embodiment of the present application.

The present application provides a current generating circuit that can substitute the current source of the charge pumping circuit. FIG. 2 is a block diagram illustrating a current generating circuit 200 according to one embodiment of the present application. As illustrated in FIG. 2, the current generating circuit 200 comprises: charge adjusting paths CP_1, CP_2, a first capacitor C_1, a second capacitor C_2 and a current generating path 201. The charge adjusting paths CP_1, CP_2 can be applied as charging paths or discharging paths. In the embodiments of FIG. 2-FIG. 15, the charge adjusting paths CP_1, CP_2 are applied as charging paths.

Please refer to FIG. 2, the charge adjusting paths CP_1, CP_2 are arranged for charging the first capacitor C_1 according to a high predetermined voltage V_DD, and arranged for charging the second capacitor C_2 according to the high predetermined voltage V_DD. The current generating path 201 generates a target current I_T based on a difference between a first voltage V_1 provided by the first capacitor C_1 and a second voltage V_2 provided by the second capacitor C_2. In one embodiment, the charge adjusting path CP_2 further level shifts the first voltage V_1 if the current generating path 201 starts to generate the target current I_T.

Please note, the connections between each device in FIG. 2 are not limited to the structure depicted in FIG. 2. For example, the second capacitor C_2 comprises a first terminal coupled to a ground voltage and a second terminal coupled to the second charge adjusting path CP_2. However, both the first terminal and the second terminal of the second capacitor C_2 can be coupled to the charge adjusting path CP_2 corresponding the circuit structure of the charge adjusting path CP_2.

The current generating circuit 200 can be applied as the pull up circuit of the charge pumping circuit or the pull down circuit of the charge pumping circuit. If the current generating circuit 200 is applied as the pull up circuit, the target current I_T is output by the current generating path 201. On the contrary, if the current generating circuit 200 is applied as the pull down circuit, the target current I_T is drained by the current generating path 201. However, the current generating circuit 200 can be applied to other circuits besides the charge pumping circuit.

Figure 3:
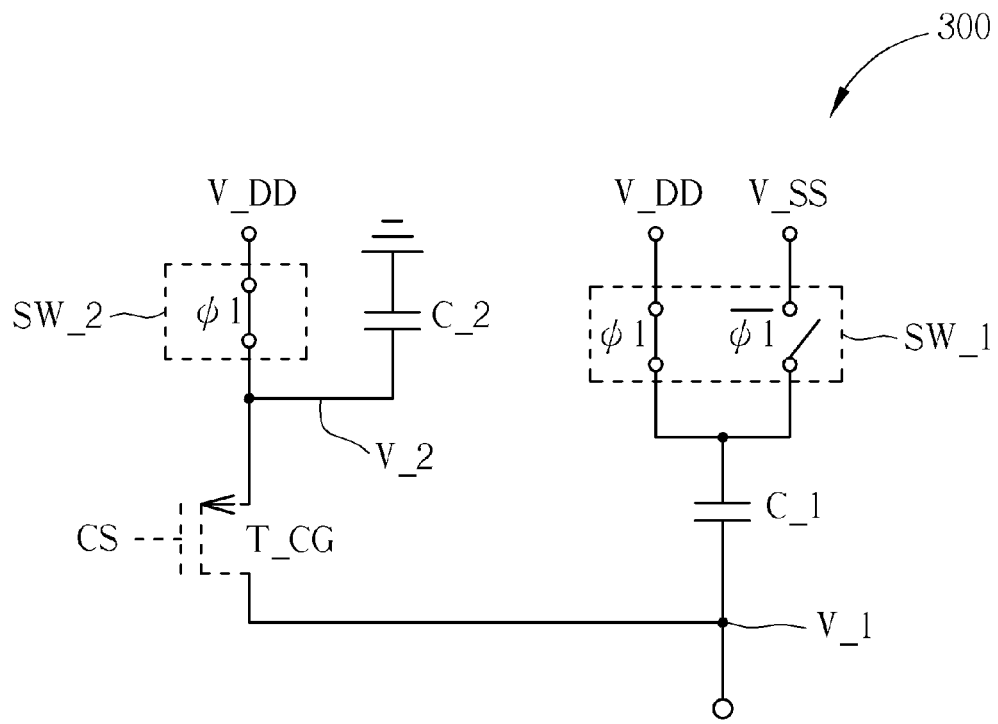
FIG. 3 and FIG. 4 are circuit diagrams illustrating a detail structure of the current generating circuit depicted in FIG. 2, according to one embodiment of the present application.
Figure 4:
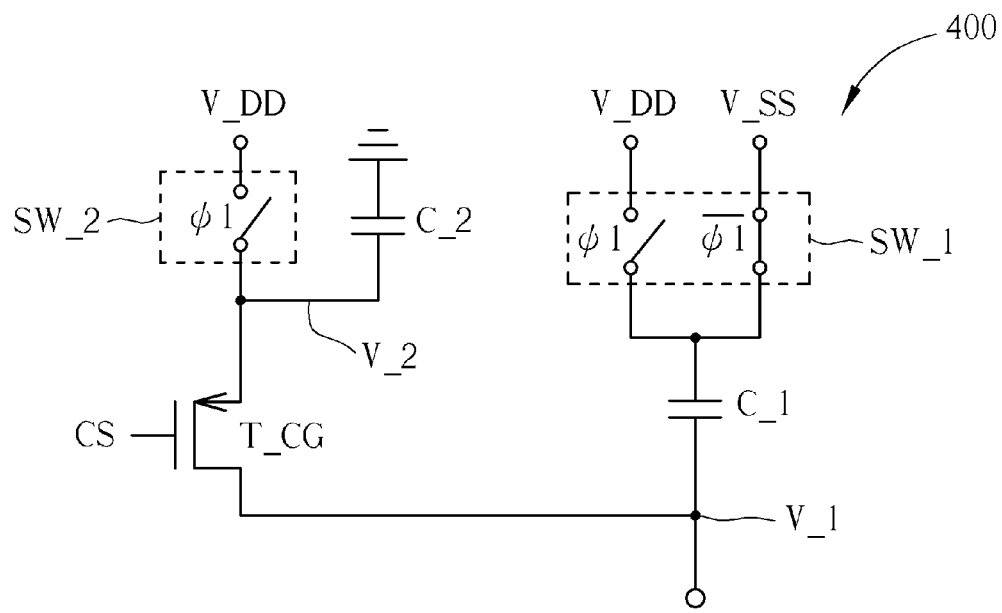

FIG. 3 and FIG. 4 are circuit diagrams illustrating a detail structure of the current generating circuit depicted in FIG. 2, according to one embodiment of the present application. FIG. 3 and FIG. 4 depict the same circuit structure but have different operations. As depicted in FIG. 3, the charge adjusting path CP_1 in FIG. 2 comprises a first switch circuit SW_1, and the charge adjusting path CP_2 in FIG. 2 comprises a second switch circuit SW_2. The first switch circuit SW_1 is coupled to the high predetermined voltage V_DD and a low predetermined voltage V_SS, and is coupled to a first terminal of the first capacitor C_1. The second switch circuit SW_2 is coupled to the high predetermined voltage V_DD, and is coupled to the second terminal of the second capacitor C_2.

Also, the current generating path 201 in FIG. 2 comprises a current generating transistor T_CG, which comprises a first terminal, a second terminal and a control terminal. The first terminal of the current generating transistor T_CG is coupled to the second terminal of the second capacitor C_2, and the second terminal of the current generating transistor T_CG is coupled to the second terminal of the first capacitor C_1. Further, the control terminal of the current generating transistor T_CG receives a control signal CS, and controlled by the control signal CS to be active or non-active. In one embodiment, the current generating transistor T_CG is a PMOSFET.

In FIG. 3, the current generating circuit 300 operates in a first mode. In such mode, the first switch circuit SW_1 couples the first terminal of the first capacitor C_1 to the high predetermined voltage V_DD, and the second switch circuit SW_2 couples the first terminal of the second capacitor C_2 to the high predetermined voltage V_DD. Also, in such mode, the current generating transistor T_CG is non-active. By this way, both the first capacitor C_1 and the second capacitor C_2 are charged.

In FIG. 4, the current generating circuit 300 operates in a second mode. In such mode, the first switch circuit SW_1 couples the first terminal of the first capacitor C_1 to the low predetermined voltage V_SS, and the second switch circuit SW_2 is non-conductive. Also, in such mode, the current generating transistor T_CG is active. By this way, the current generating transistor T_CG generates the target current I_T based on a first voltage V_1 provided by the first capacitor C_1 and a second voltage V_2 provided by the second capacitor C_2. In such mode, the target current I_T decreases with time while the current generating transistor T_CG generating the target current, since the second voltage V_2 decreases with time while the current generating transistor T_CG generating the target current. In one embodiment, the current generating transistor T_CG is active after the first switch circuit SW_1 couples the first terminal of the first capacitor C_1 to the low predetermined voltage V_SS and the second switch circuit SW_2 becomes non-conductive.

AS above-mentioned, the current generating circuit provided by the present application can be applied to a charge pumping circuit. The charge pumping circuit comprising the current providing circuit mentioned above will be described below. Please note the current providing circuit is applied as a pull up circuit in the following embodiments. However, the current providing circuit can be applied as a pull down circuit as well.

Figure 5:
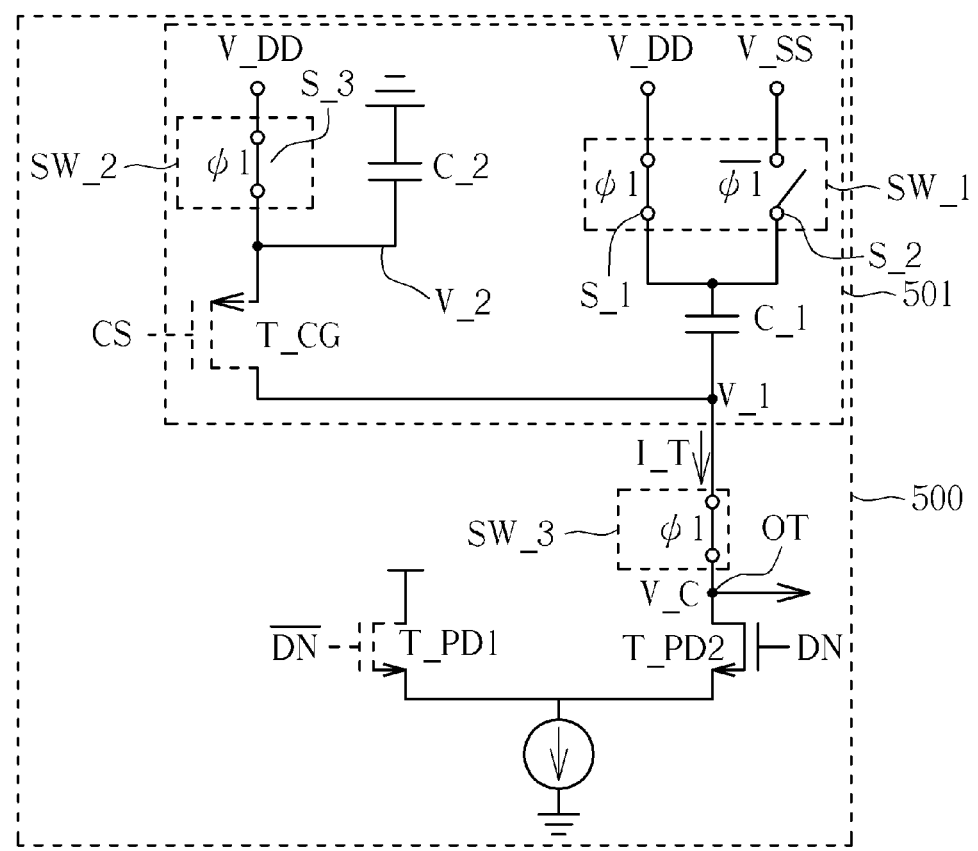
FIG. 5 and FIG. 6 are circuit diagrams illustrating detail structures of a charge pumping circuit according to another embodiment of the present application.
Figure 6:
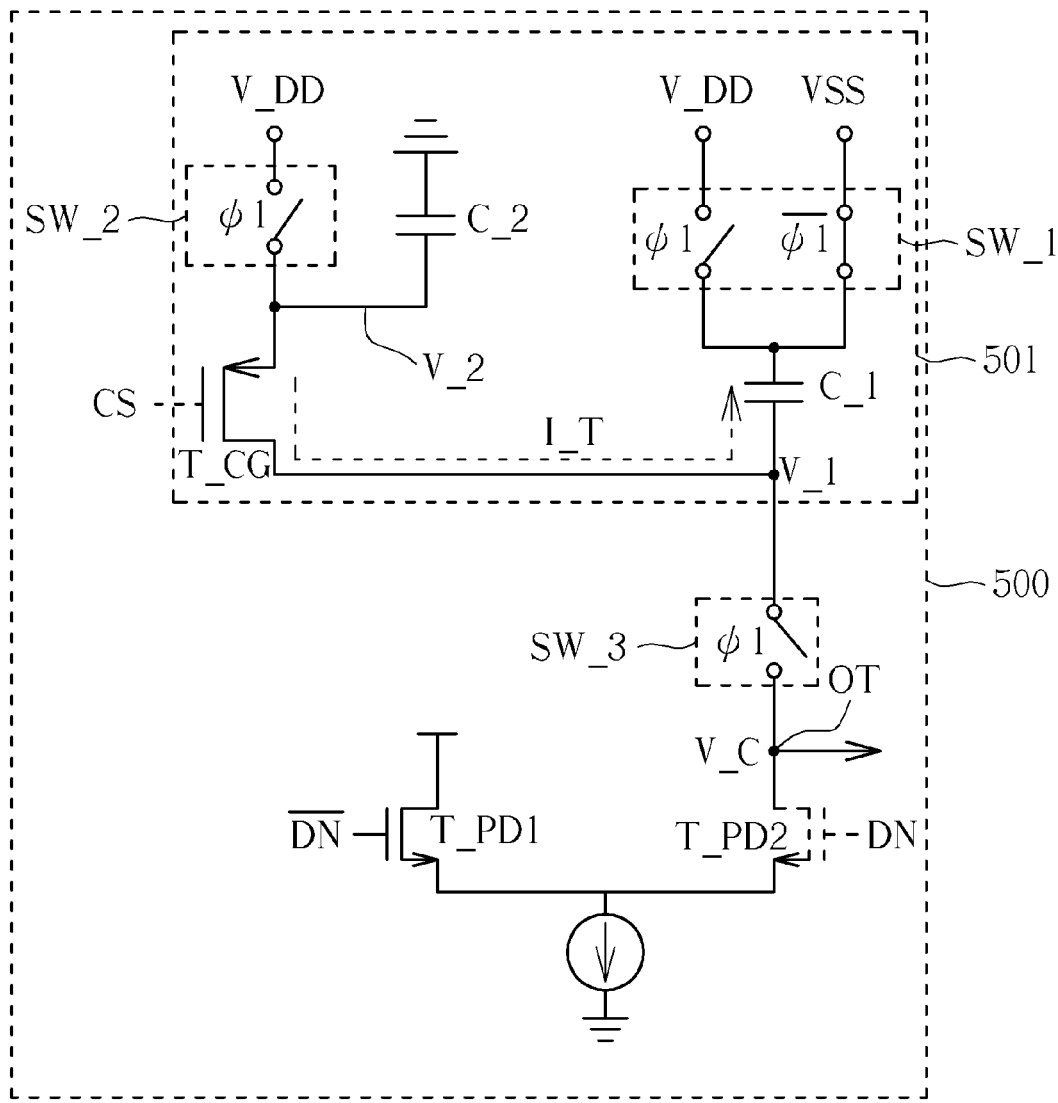
Figure 7:
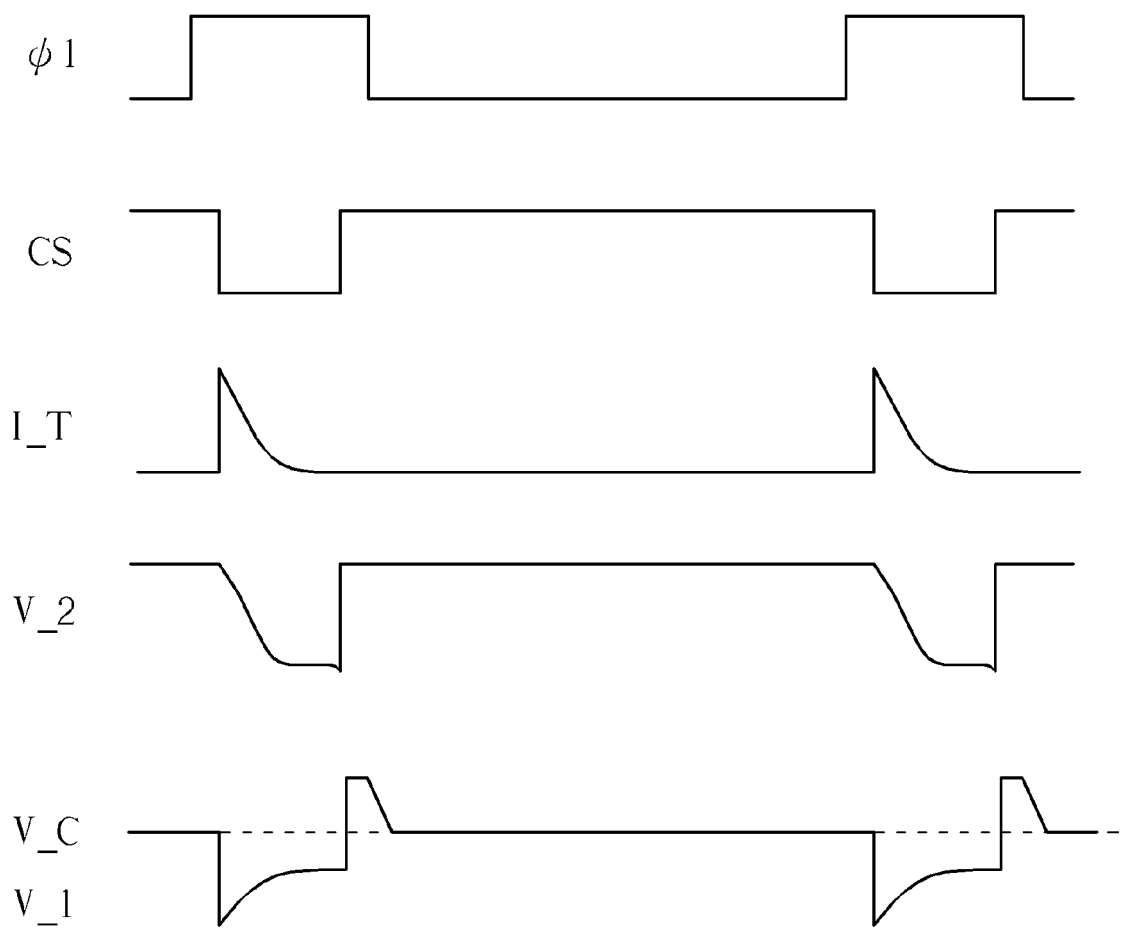
FIG. 7 is a schematic diagram illustrating the operations for the charge pumping circuit depicted in FIG. 5 and FIG. 6.

FIG. 5 and FIG. 6 are circuit diagrams illustrating detail structures of a charge pumping circuit according to one embodiment of the present application. The charge pumping circuit in FIG. 5 and FIG. 6 comprises the same circuit structure but different operations. The operations for the charge pumping circuit in FIG. 5 and FIG. 6 are depicted in FIG. 7. Accordingly, please refer FIG. 5, FIG. 6 and FIG. 7 together to understand the present application for more clear.

As illustrated in FIG. 5, the charge pumping circuit 500 comprises a current providing circuit 501, which comprises a circuit structure the same as which depicted in FIG. 3 and FIG. 4. Please note, the pull down circuits depicted in FIG. 5 and FIG. 6 comprise two pull down transistors T_PD1 and T_PD2, but can be replaced by a pull down circuit with other circuit structures. Please refer to FIG. 7, if the signal Φ1 has a low logic level, it means the switch units S_1, S_3 in the first switch circuit SW_1 are conductive, and the switch unit S_2 in the second switch circuit SW_2 is non-conductive. On the contrary, if the signal Φ1 has a high logic level, it means the switches S_1, S_3 are non-conductive, and the switch unit S_2 is conductive. Also, if the control signal CS has a low logic level, the current generating transistor T_CG is active. On the contrary, if the control signal CS has a high logic level, the current generating transistor T_CG is non-active. Accordingly, the circuit depicted in FIG. 5 operates in a state that the signal Φ1 has a low logic level and the control signal CS has a high logic level. That is, the current providing circuit 501 operates in the first mode depicted in FIG. 3.

The charge pumping circuit 500 further comprises a third switch module S_W 3, which can isolate the current providing circuit 501 and a circuit (ex. a filter) coupled to the output terminal OT. In the embodiment of FIG. 5, the third switch module Sw_3 is conductive. Also, in the embodiment of FIG. 5, the pull down transistor T_PD1 of the pull down circuit is non-conductive and the pull down transistor T_PD2 of the discharging pull up circuit is conductive.

The circuit depicted in FIG. 6 operates in a state that the signal Φ1 has a high logic level and the control signal CS has a low logic level. That is, the current providing circuit 501 operates in the second mode depicted in FIG. 4. Please refer to FIG. 7, since the current generating transistor T_CG is conductive in the embodiment of FIG. 6, the target current I_T is generated according to the first voltage V_1 and the second voltage V_2. As depicted in FIG. 7, the target current I_T decreases with time while the current generating transistor T_CG generating the target current I_T, since the second voltage V_2 provided by the second capacitor C_2 decreases with time. If the second voltage V_2 is lower than the threshold voltage of the current generating transistor T_CG minus the first voltage V_1, the current generating transistor T_CG stops generating the target current I_T. Additionally, in the embodiment of FIG. 6, the third switch module SW_3 is non-conductive, the pull-down transistor T_PD1 of the pull down circuit is conductive and the pull down transistor T_PD2 of the pull up circuit is non-conductive.

As shown in FIG. 7, the first voltage V_1 at the second terminal of first capacitor C_1 is drop if the current generating transistor T_CG starts to generate the target current I_T, since the first capacitor C_1 is coupled to the low predetermined voltage V_SS, which is lower than the high predetermined voltage V_DD. Accordingly, it can be regarded that first voltage V_1 is level-shifted by first switch circuit SW_1 if the current generating transistor T_CG starts to generate the target current I_T. Since the target current I_T flows to the first capacitor C_1, the first voltage V_1 gradually increases, but keeps smaller than the second voltage V_2. The control voltage V_CN indicates a value of the control voltage V_C when the charge pumping circuit operates in a normal state, which will be described later.

Please note the signal Φ1 and the control signal CS do not transit at the same time, which means more operations can be included between the first mode and the second mode. The detail operations for the charge pumping circuit provided by the embodiments of the present application will be described later.

Figure 8:
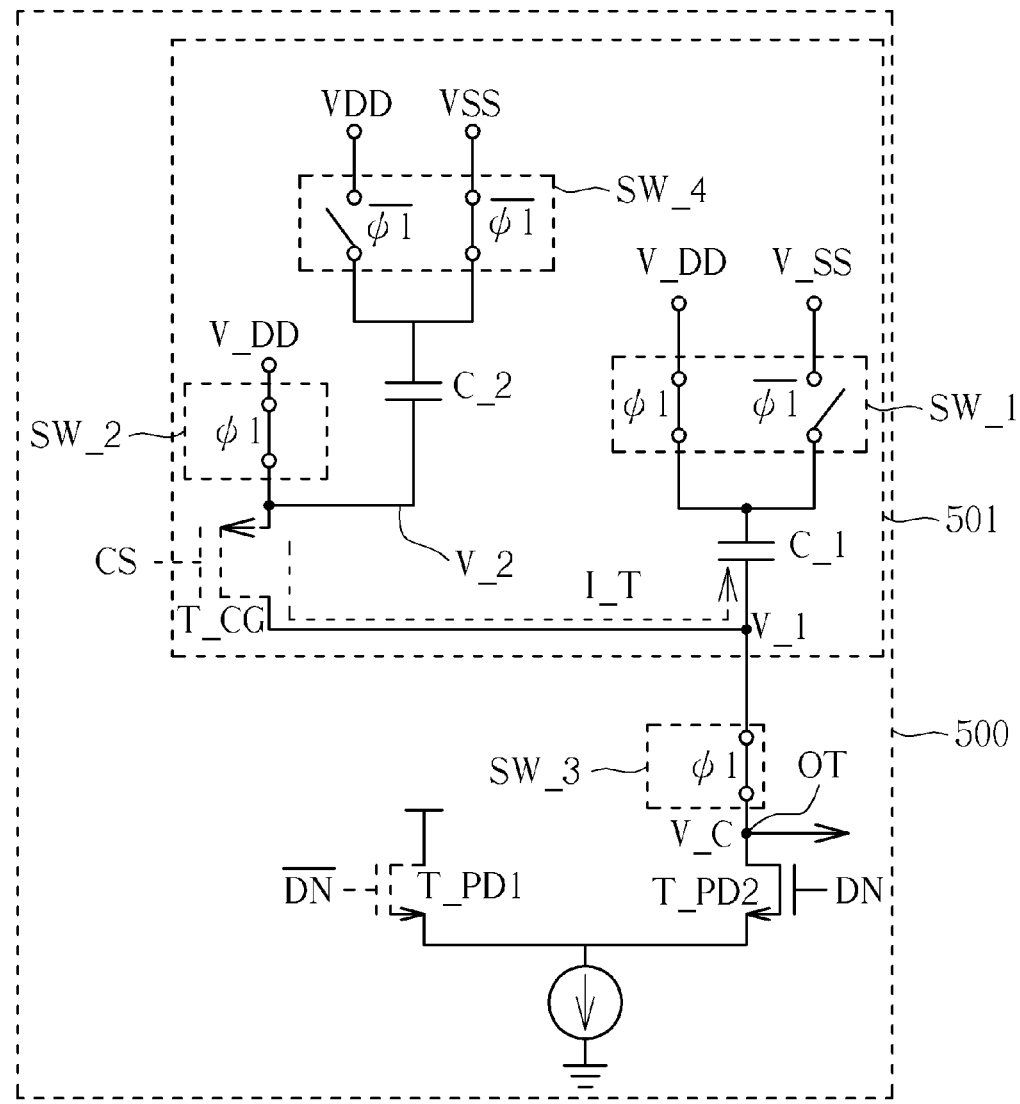
FIG. 8 is a circuit diagram illustrating a detail structure of a charge pumping circuit according to one embodiment of the present application.

FIG. 8 is a circuit diagram illustrating a detail structure of a charge pumping circuit according to one embodiment of the present application. Comparing with the embodiments depicted in FIG. 5 and FIG. 6, the embodiment in FIG. 8 further comprises a fourth switch module SW_4. In the first mode (i.e. the embodiment in FIG. 5), the fourth switch module SW_4 is coupled to the low predetermined voltage V_SS. Also, in the second mode (i.e. the embodiment in FIG. 6), the fourth switch module SW_4 is coupled to the high predetermined voltage V_DD. Due to the existence of the fourth switch module SW_4, the current generating transistor T_CG can provide the target current I_T for a longer period of time since the second capacitor C_2 can provide a larger voltage 2V_DD if the current generating circuit 501 changes from the first mode to the second mode. Besides, in such case, the signal noise ration (SNR) can be further improved since the capacitor C_2 can have smaller capacitance. The embodiment of FIG. 3 and FIG. 4 can also comprise the fourth switch module SW_4 depicted in FIG. 8.

Figure 9:
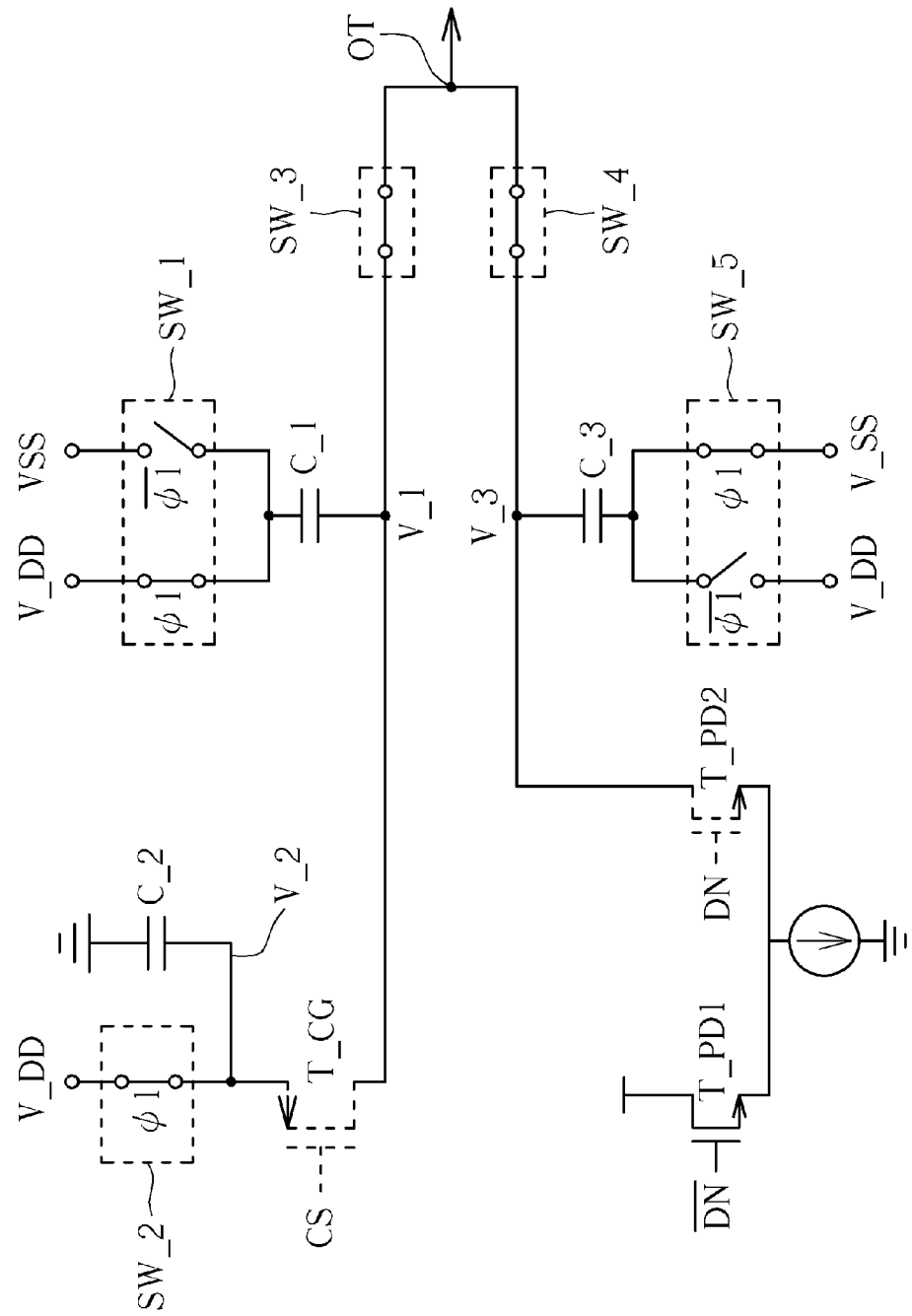
FIG. 9 is a circuit diagram illustrating a detail structure of a charge pumping circuit according to another embodiment of the present application.

FIG. 9 is a circuit diagram illustrating a detail structure of a charge pumping circuit according to another embodiment of the present application. Comparing with the embodiment depicted in FIG. 5, the embodiment depicted in FIG. 9 further comprises a third capacitor C_3, a fourth switch circuit SW_4 and a fifth switch circuit SW_5. The third capacitor C_3 comprises a first terminal coupled to the fourth switch circuit SW_4, and a second terminal coupled to the fifth switch circuit SW_5. The fourth switch circuit SW_4 operates the same as the third switch circuit SW_3. Also, the fifth switch circuit SW_5 couples the second terminal of the third capacitor C_3 to the low predetermined voltage V_SS in the first mode, and couples the second terminal of the third capacitor C_3 to the high predetermined voltage V_DD in the second mode.

FIG. 10-FIG. 14 are circuit diagrams illustrating different operations for the embodiment depicted in FIG. 9. FIG. 15 is a circuit diagram summarizing the operations depicted in FIG. 9-FIG. 14. Please refer to FIG. 9-FIG. 15 together to understand the concept of the present application for more clear.

As above-mentioned, in the embodiment of FIG. 9 (i.e. the first mode depicted in FIG. 5), the first switch module SW_1 couples the first terminal of the first capacitor C_1 to the high predetermined voltage V_DD, the second switch circuit SW_2 couples the second terminal of the second capacitor C_2 to the high predetermined voltage V_DD, the third switch circuit SW_3 and the fourth switch circuit SW_4 are conductive, and the fifth switch module SW_5 couples the second terminal of the third capacitor C_3 to the low predetermined voltage V_SS. Also, the current generating transistor T_CG is non-conductive. Further, the pull down transistor T_PD1 is conductive and the pull down transistor T_PD2 is non-conductive (i.e. the pull down circuit is non-conductive). Accordingly, the embodiment in FIG. 9 operates in a normal state, as illustrated in FIG. (a) of FIG. 15.

As stated in FIG. (a) of FIG. 15, the second voltage V_2 has a high value since the second capacitor C_2 is charged by the high predetermined voltage V_DD. Also, the first voltage V_1, and the third voltage V_3 at the first terminal of third capacitor C_3 have the same values since the second terminal of the second capacitor C_2 and the first terminal of the third capacitor C_3 are coupled. Also, the voltage V_C22 at the first terminal of the second capacitor C_2 is high since the first terminal of the second capacitor C_2 is coupled to the high predetermined voltage V_DD. The voltage V_C11 at the second terminal of the first capacitor C_1 is low since the second terminal of the third capacitor C_3 is coupled to the low predetermined voltage V_SS.

Figure 10:
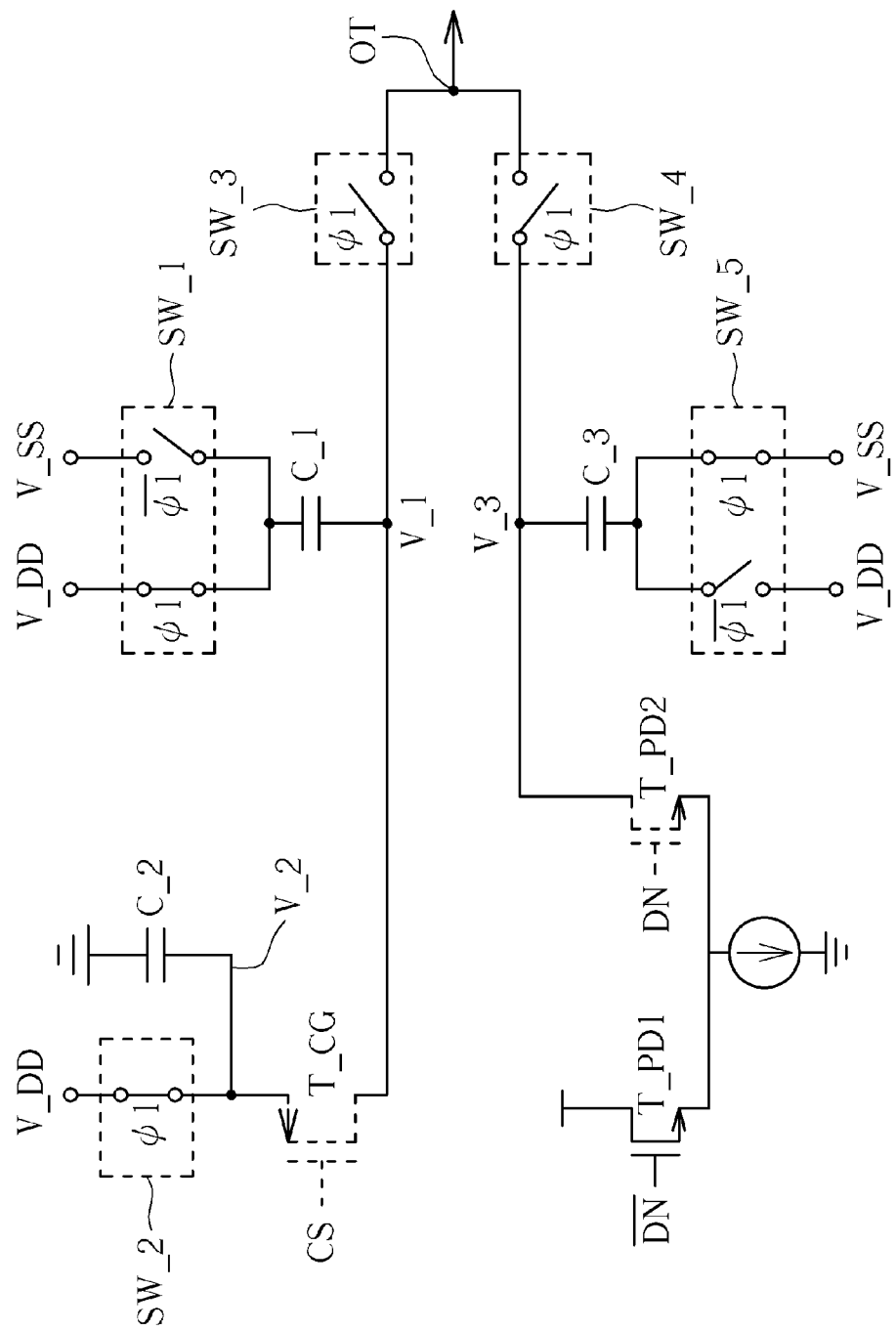
FIG. 10-FIG. 14 are circuit diagrams illustrating the operation for the circuit depicted in FIG. 9 of the present application.

After the FIG. (a) of FIG. 15, the third switch circuit SW_3 and the fourth switch circuit SW_4 become non-conductive, as illustrated in FIG. 10 and FIG. (b) of FIG. 15. In such case, either the pull up circuit or the pull down circuit is isolated from a circuit coupled to the output terminal OT. In such case, all voltages are the same as which in FIG. (a) of FIG. 15. For the FIG. (b) of FIG. 15, the charge pumping circuit can be regarded as operating in a third mode.

Figure 11:
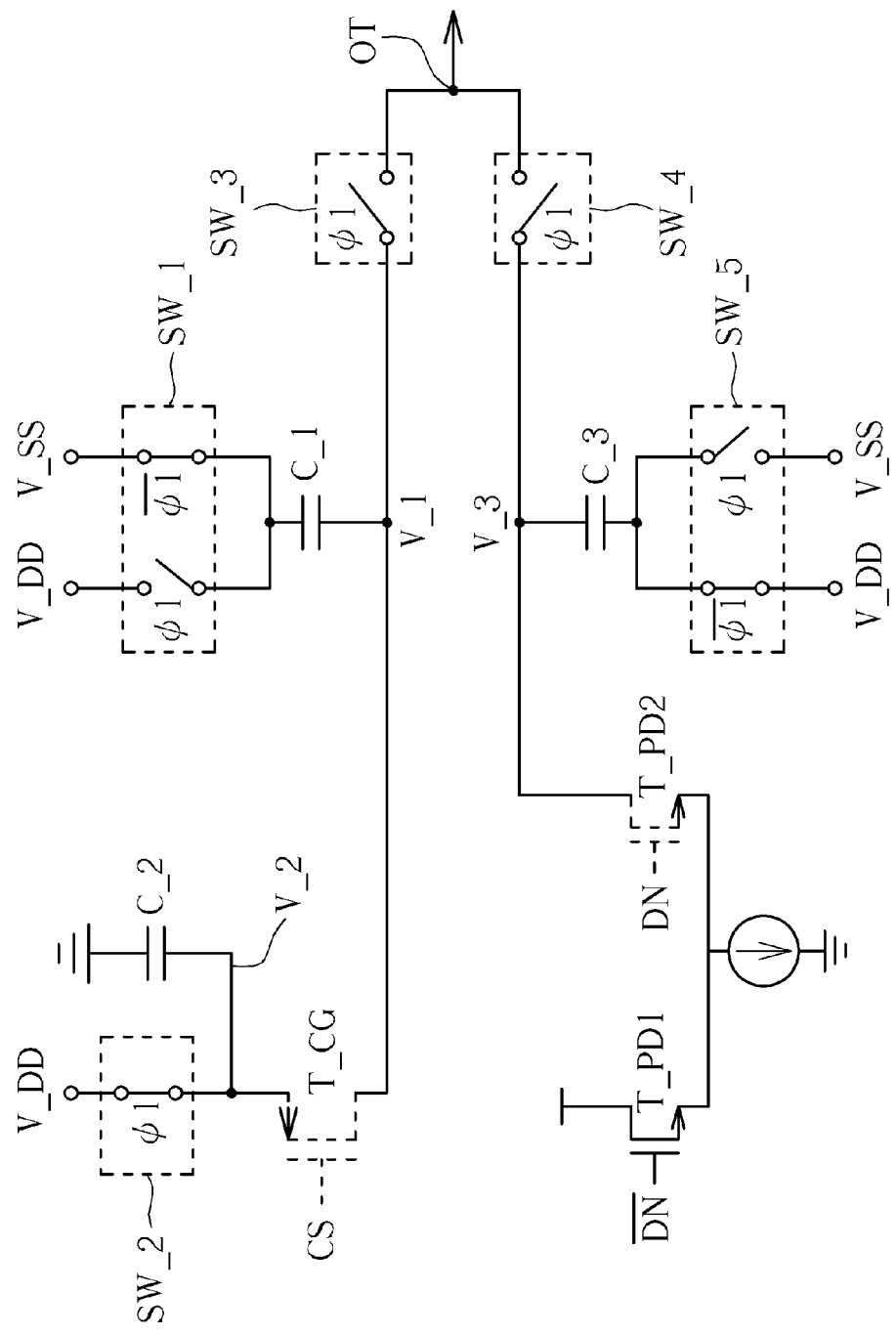

After the FIG. 10 and the FIG. (b) of FIG. 15, the first switch circuit SW_1 couples the first terminal of the second capacitor C_2 to the low predetermined voltage V_SS, and the fifth switch circuit SW_5 couples the second terminal of the third capacitor C_3 to the high predetermined voltage V_DD, as illustrated in the FIG. 11 and the FIG. (c) of FIG. 15. By this way, the voltage V_C22 is pulled low and the voltage V_C11 is pulled high. The first voltage V_1 is level shifted by the second capacitor C_2 thus becomes low. Similarly, the third voltage V_3 is level shifted by the third capacitor C_3 thus becomes high. For the FIG. (c) of FIG. 15, the charge pumping circuit can be regarded as operating in a fourth mode.

Figure 12:
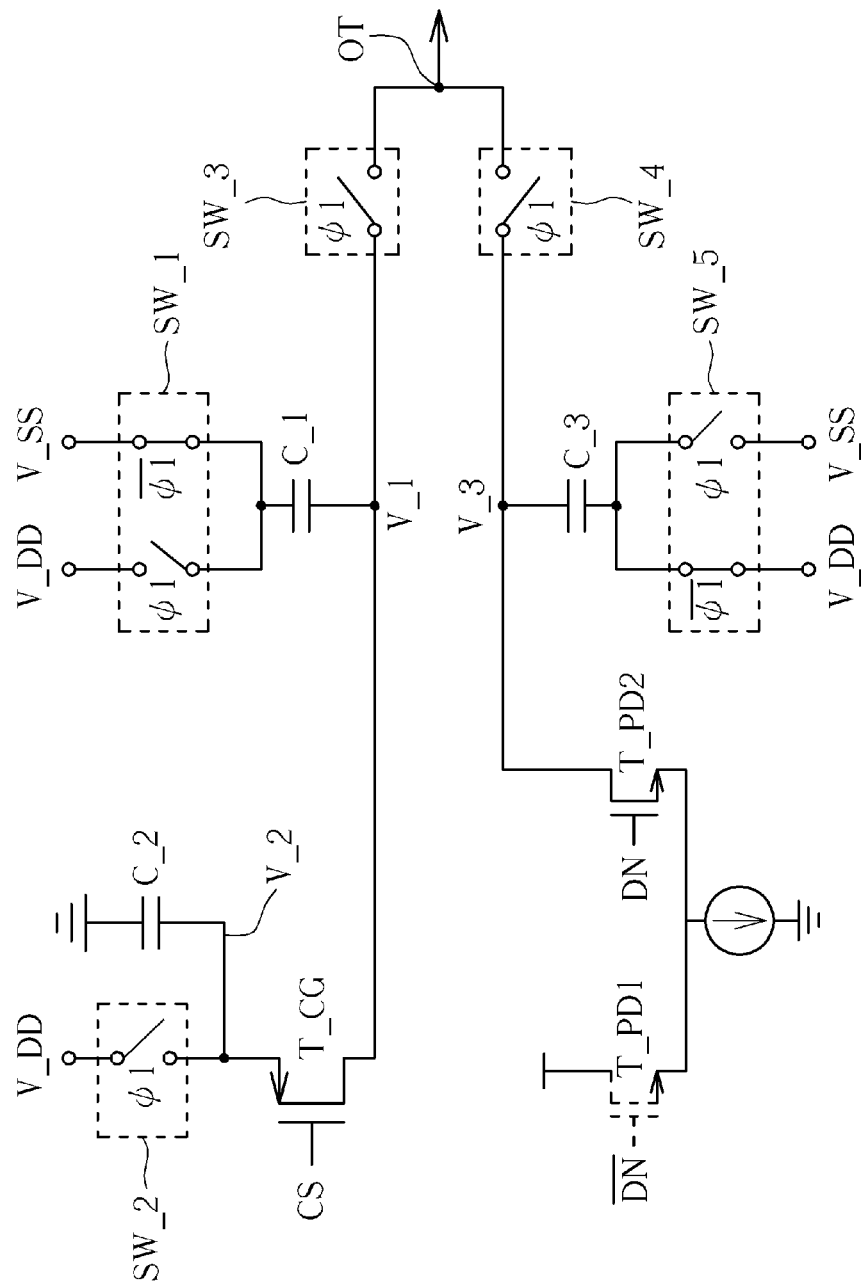

After the FIG. 11 and the FIG. (c) of FIG. 15, the current generating transistor T_CG and the pull down transistor T_PD2 are active, and the transistor T_PD1 is non-active (i.e. the pull down circuit is active), as illustrated in FIG. 12 and the FIG. (d) of FIG. 15 (i.e. the second mode in FIG. 6). By this way, a target current I_T1 (a pull-up current) is generated by the current generating transistor T_CG and a target current I_T2 (a pull-down current) is generated via the pull down transistor T_PD2 (i.e. a conventional current source). Accordingly, the first voltage V_1 gradually raises up since the target current I_T1 charges the second capacitor C_2 and the first voltage V_1 gradually falls down due to the target current I_T2 flows away from the third capacitor C_3.

Figure 13:
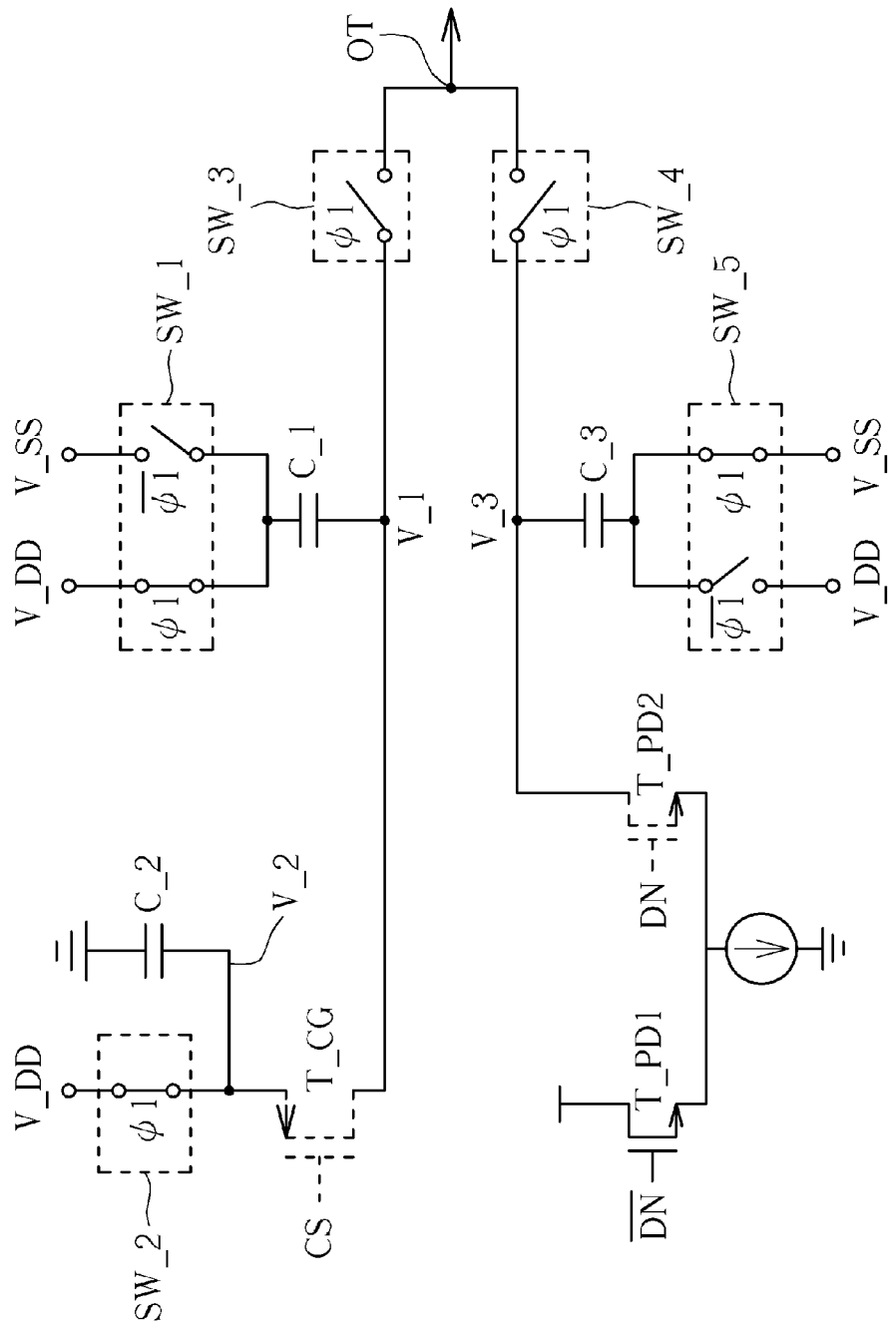

After the FIG. 12 and the FIG. (d) of FIG. 15, the first switch module SW_1 couples the first terminal of the first capacitor C_1 to the high predetermined voltage V_DD, the second switch circuit SW_2 couples the second terminal of the second capacitor C_2 to the high predetermined voltage V_DD, the third switch circuit SW_3 and the fourth switch circuit SW_4 become non-conductive, and the fifth switch module SW_5 couples the second terminal of the third capacitor C_3 to the low predetermined voltage V_SS, as illustrated in FIG. 13 and the FIG. (e) of FIG. 15. Also, the current generating transistor T_CG and the pull down transistor T_PD2 become non-active, and the transistor T_PD1 becomes non-active. In such case, the second voltage V_2 is pulled high, the first voltage V_1 is pulled high, and the third voltage V_3 is pulled low. However, the first voltage V_1 in FIG. (e) of FIG. 15 is higher than which in FIG. (a) of FIG. 15 and the third voltage V_3 in FIG. (e) of FIG. 15 is lower than which in FIG. (a) of FIG. 15.

Figure 14:
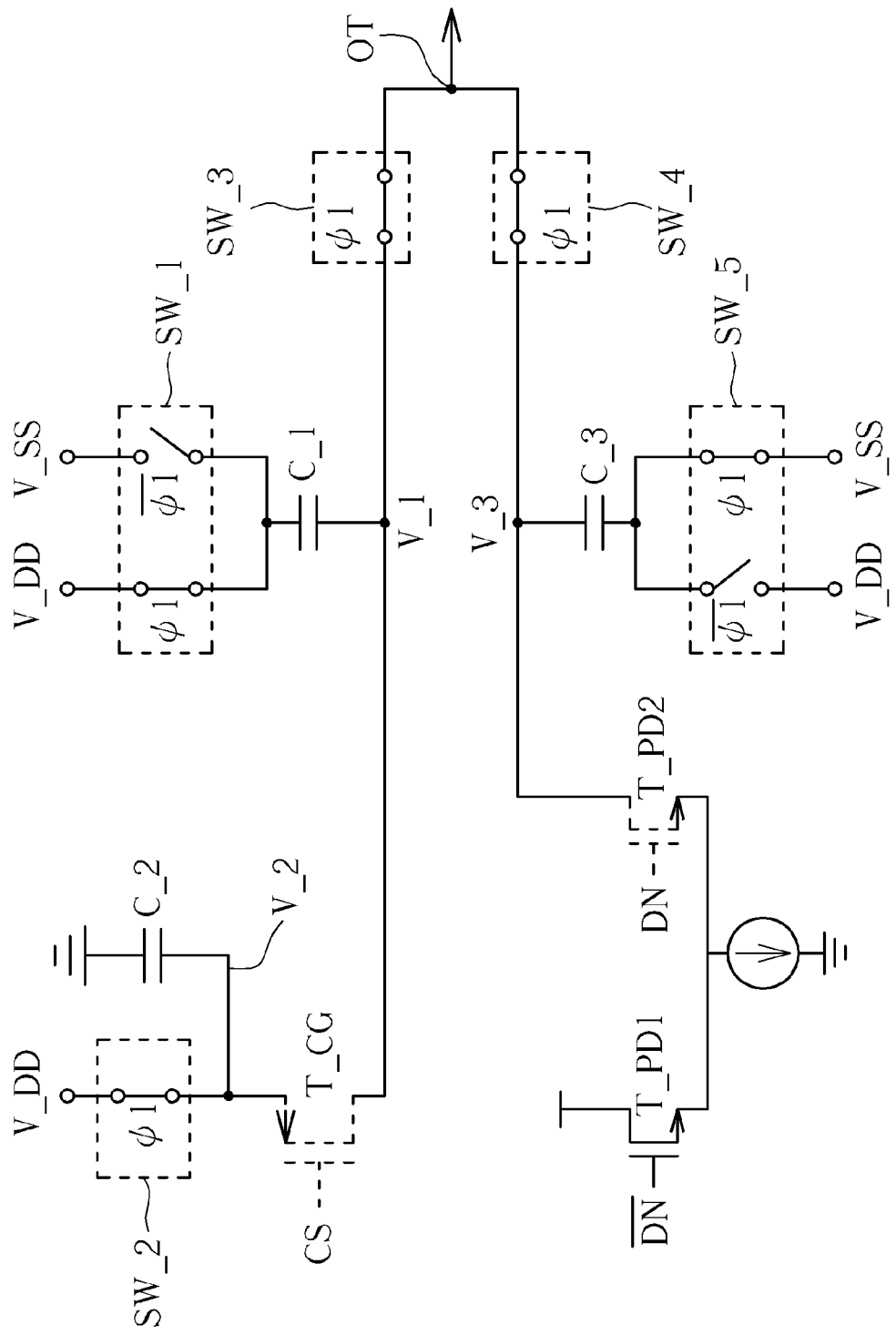
Figure 15:
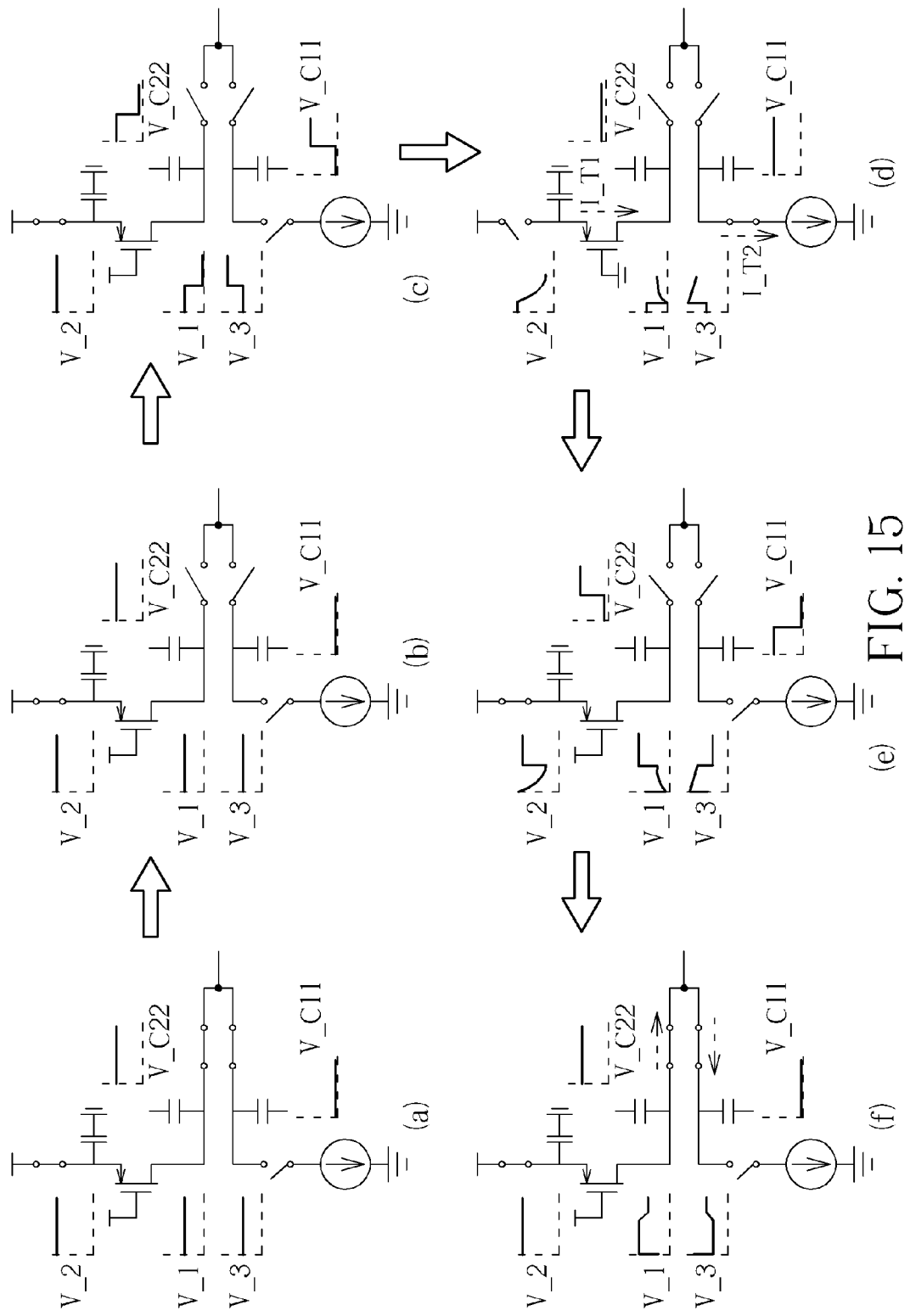
FIG. 15 is a circuit diagram summarizing the operations depicted in FIG. 9-FIG. 14.

After the FIG. 13 and the FIG. (e) of FIG. 15, the third switch circuit SW_3 and the fourth switch circuit SW_4 are conductive, as illustrated in FIG. 13 and the FIG. (f) of FIG. 14. Accordingly, the second terminal of the first capacitor are the first terminal of the third capacitor are coupled, such that the first voltage V_1 and the third voltage V_3 become the same as which in FIG. 13 and FIG. (a) of FIG. 15. Then, the charge pumping circuit enters the normal state in FIG. (a) of FIG. 15.

It will be appreciated that the operations depicted in FIG. 9-FIG. 14 and FIG. (a)-FIG. (f) in FIG. 15 can be applied to the embodiments in FIG. 3-FIG. 6 as well.

Figure 16:
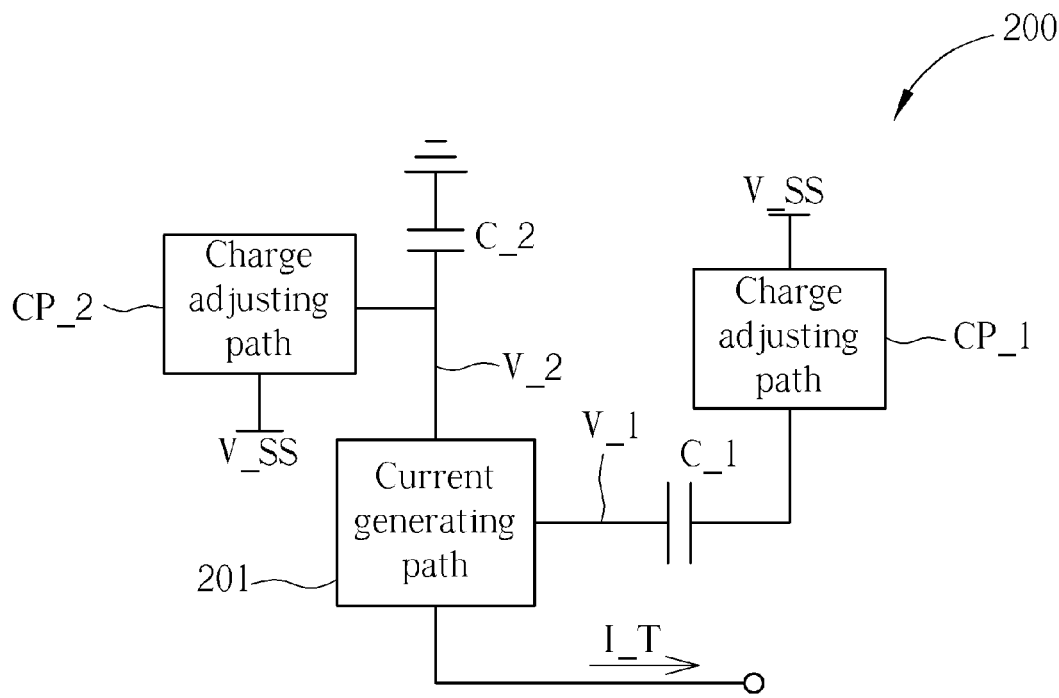
FIG. 16 is a block diagram illustrating a current generating circuit according to another embodiment of the present application, corresponding to FIG. 2.
Figure 17:
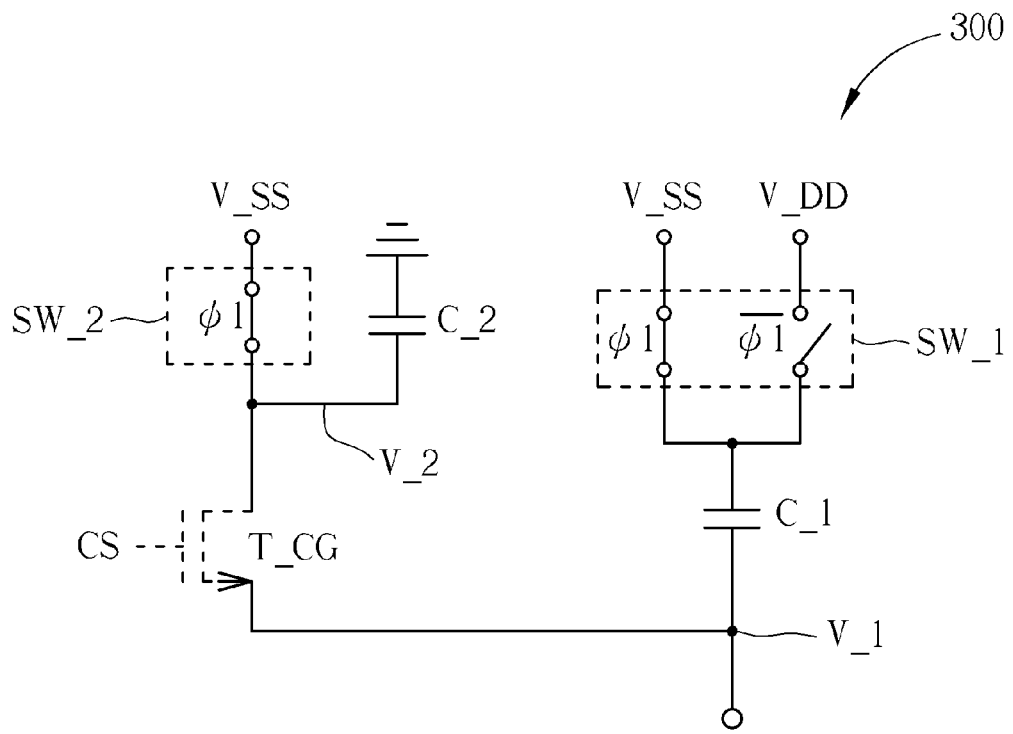
FIG. 17 and FIG. 18 are circuit diagrams illustrating a detail structure of the current generating circuit depicted in FIG. 16, according to another embodiment of the present application.
Figure 18:
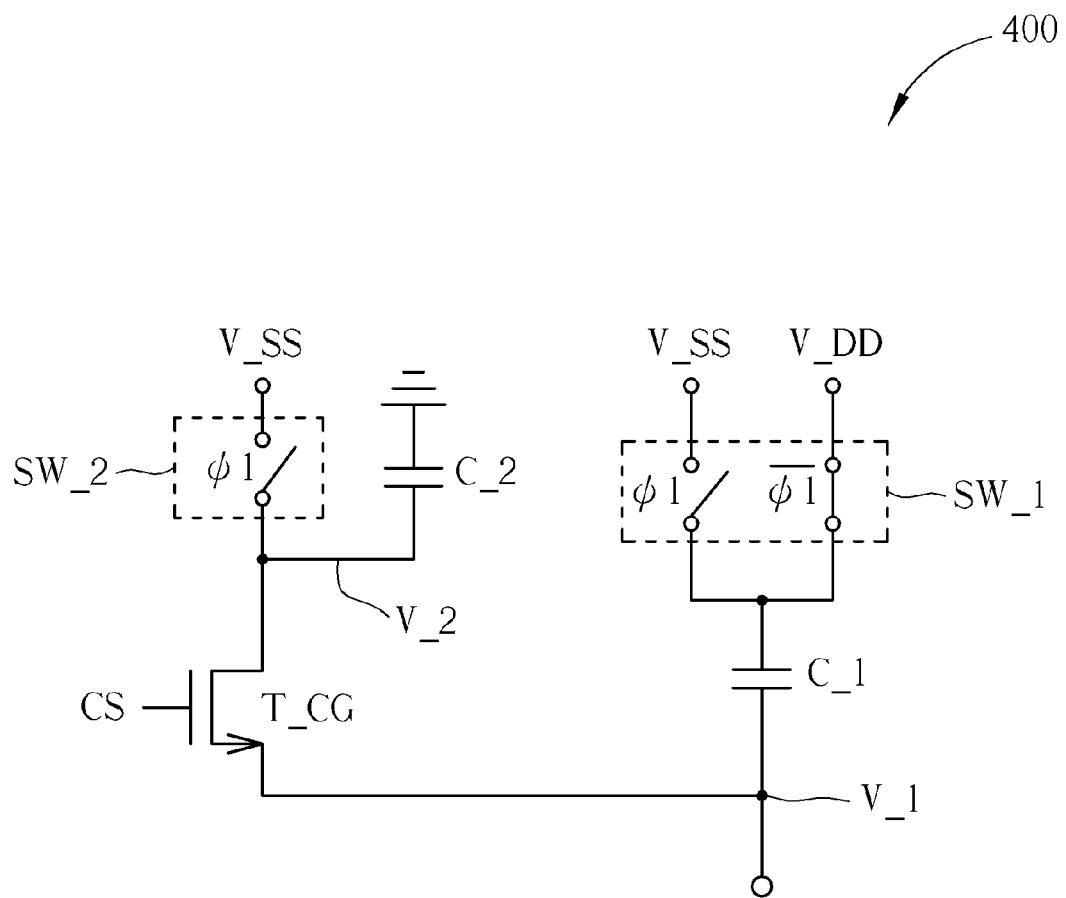

As above-mentioned, the charge adjusting path can be applied as a charging path or a discharging path. FIG. 16-18 are circuit diagrams illustrating the embodiments that the charge adjusting paths are applied as discharging paths, which correspond to FIG. 2, FIG. 3 and FIG. 4 of the present application.

FIG. 16 is a circuit diagram corresponding to FIG. 2. Comparing with FIG. 2, the high predetermined voltage V_DD is replaced with the low predetermined voltage V_SS. In such case, the charge adjusting path CP_1 discharges the first capacitor C_1 according to the low predetermined voltage V_SS, and the charge adjusting path CP_2 discharges the second capacitor C_2 according to the low predetermined voltage V_SS. Also, the target current I_T flows from the first capacitor C_1 to the second capacitor C_2 and then outputted by the current generating path 201.

FIG. 17 and FIG. 18 are circuit diagrams corresponding to FIG. 3 and FIG. 4. Comparing with FIG. 3 and FIG. 4, the locations for the high predetermined voltage V_DD and the low predetermined voltage are swapped, thus the operation for the charge adjusting circuits are changed from charging to discharging.

Please note the current generating transistor T_CG in FIG. 17 and FIG. 18 is an NMOSFET rather than a PMOSFET. The operations depicted in FIG. 2 to FIG. 15 can be applied to the embodiments of FIG. 16-FIG. 18. The only difference is the generation of target current is changed from "charging" the capacitors to "discharging" the capacitors. Persons skilled in the art can understand the details for the embodiments of FIG. 16-FIG. 18 in view of the embodiments in FIG. 2 to FIG. 15, thus are omitted for brevity here.

In view of above-mentioned description, a current generating circuit according to the embodiments can be summarized as: a current generating circuit comprising: a first capacitor, comprising a first terminal and a second terminal; a second capacitor, comprising a first terminal and a second terminal; a first charge adjusting path, arranged for adjusting charges of the first capacitor according to a first charge adjusting voltage; a second charge adjusting path, arranged for adjusting charges of the second capacitor according to the first charge adjusting voltage; and a current generating path, coupled to the first capacitor and the second capacitor, arranged for generating a target current based on a difference between a first voltage provided by the first capacitor and a second voltage provided by the second capacitor.

For the embodiments depicted in FIG. 2-FIG. 15, the charge adjusting paths are applied to charge the first capacitor and the second capacitor, and the first charge adjusting voltage is the high predetermined voltage V_DD. Also, for the embodiments depicted in FIG. 2-FIG. 15, the charge adjusting paths are applied to discharge the first capacitor and the second capacitor, and the first charge adjusting voltage is the low predetermined voltage V_SS. For the embodiments depicted in FIG. 2-FIG. 15, the low predetermined voltage V_SS can be regarded as a second charge adjusting voltage. Oppositely, for the embodiments depicted in FIG. 16-FIG. 18, the high predetermined voltage V_DD can be regarded as a second charge adjusting voltage.

Based upon above-mentioned embodiments, a current generating method applied to a current generating circuit comprising a first capacitor and a second capacitor can be acquired. The current generating method comprises the following steps: adjusting charges of the first capacitor according to a first charge adjusting voltage; adjusting charges of the second capacitor according to the first charge adjusting voltage; and generating a target current based on a difference between a first voltage provided by the first capacitor and a second voltage provided by the second capacitor.

In view of above-mentioned embodiments, a current generating circuit applying capacitors to generate currents is applied to substitute the conventional current source. Accordingly, the noise of the current source can be suppressed such that a large overdrive voltage is no longer needed. By this way, a wide head room for the current generating circuit can be provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A current generating circuit, comprising:
   a first capacitor, comprising a first terminal and a second terminal;
   a second capacitor, comprising a first terminal and a second terminal;

a first charge adjusting path, arranged for adjusting charges of the first capacitor according to a first charge adjusting voltage;

a second charge adjusting path, arranged for adjusting charges of the second capacitor according to the first charge adjusting voltage; and a current generating path, coupled to the first capacitor and the second capacitor, arranged for generating a target current based on a difference between a first voltage provided by the first capacitor and a second voltage provided by the second capacitor.

2. The current generating circuit of claim 1,
wherein the first charge adjusting path comprises:
a first switch circuit, coupled to the first charge adjusting voltage and a second charge adjusting voltage, and coupled to the first terminal of the first capacitor;
wherein the second charge adjusting path comprises:
a second switch circuit, coupled to the first charge adjusting voltage, and coupled to the second terminal of the second capacitor.

3. The current generating circuit of claim 2, wherein the first switch circuit couples the first terminal of the first capacitor to the first charge adjusting voltage in a first mode, and couples the first terminal of the first capacitor to the second charge adjusting voltage in a second mode, wherein the second switch circuit couples the first terminal of the second capacitor to the first charge adjusting voltage in the first mode, and does not couple the first terminal of the second capacitor to the second charge adjusting voltage in the second mode.

4. The current generating circuit of claim 3, further comprising:
a fourth switch circuit, arranged for coupling the first terminal of the second capacitor to the second charge adjusting voltage in the first mode, and arranged for coupling the first terminal of the second capacitor to the first charge adjusting voltage in the second mode.

5. The current generating circuit of claim 3, wherein the current generating path comprises the first capacitor, the second capacitor and a current generating transistor;
wherein the current generating transistor comprises a first terminal coupled to the second terminal of the second switch circuit, and comprises the second terminal coupled to the second terminal of the first capacitor.

6. The current generating circuit of claim 5, wherein the current generating transistor is non-active in a fourth mode;
wherein the first switch circuit couples the first terminal of the first capacitor to the low predetermined voltage in the fourth mode, wherein the second switch circuit does not couple the first terminal of the second capacitor to the low predetermined voltage in the fourth mode.

7. The current generating circuit of claim 5, wherein the current providing transistor is active in the second mode.

8. A charge pumping circuit, comprising:
an output terminal;
a current generating circuit, comprising:
a first capacitor, comprising a first terminal and a second terminal;
a second capacitor, comprising a first terminal and a second terminal;
a first charge adjusting path, arranged for adjusting charges of the first capacitor according to a first charge adjusting voltage;
a second charge adjusting path, arranged for adjusting charges of the second capacitor according to the first charge adjusting voltage; and
a current generating path, coupled to the first capacitor the second capacitor and the output terminal, arranged for generating a target current based on a difference between a first voltage provided by the first capacitor and a second voltage provided by the second capacitor.

9. The charge pumping circuit of claim 8, wherein the target current flows from the current generating path to the output terminal.

10. The charge pumping circuit of claim 8, wherein the target current flows from the output terminal to the current generating path.

11. The charge pumping circuit of claim 8,
wherein the first charge adjusting path comprises:
a first switch circuit, coupled to the first charge adjusting voltage and a second voltage, and coupled to the first terminal of the first capacitor;
wherein the second charge adjusting path comprises:
a second switch circuit, coupled to the first charge adjusting voltage, and coupled to the second terminal of the second capacitor.

12. The charge pumping circuit of claim 11, wherein the first switch circuit couples the first terminal of the first capacitor to the first charge adjusting voltage in a first mode, and couples the first terminal of the first capacitor to the second charge adjusting voltage in a second mode, wherein the second switch circuit couples the first terminal of the second capacitor to the first charge adjusting voltage in the first mode, and does not couple the first terminal of the second capacitor to the second charge adjusting voltage in the second mode.

13. The charge pumping circuit of claim 12, further comprising:
a fourth switch circuit, arranged for coupling the first terminal of the second capacitor to the second charge adjusting voltage in the first mode, and arranged for coupling the first terminal of the second capacitor to the first charge adjusting voltage in the second mode.

14. The charge pumping circuit of claim 12, wherein the current generating path comprises the first capacitor, the second capacitor and a current generating transistor;
wherein the current generating transistor comprises a first terminal coupled to the second terminal of the second switch circuit, and comprises the second terminal coupled to the second terminal of the first capacitor.

15. The charge pumping circuit of claim 14, wherein the current generating transistor is non-active in a fourth mode;
wherein the first switch circuit couples the first terminal of the first capacitor to the second charge adjusting voltage in the fourth mode, wherein the second switch circuit does not couple the first terminal of the second capacitor to the second charge adjusting voltage in the fourth mode.

16. The charge pumping circuit of claim 14, wherein the current providing transistor is active in the second mode.

17. The charge pumping circuit of claim 8, further comprising a third switch circuit coupled between the output terminal and the current generating path, wherein the third switch circuit is conductive in the first mode and non-conductive in the second mode.

18. A current generating method, applied to a current generating circuit comprising a first capacitor and a second capacitor, comprising:
adjusting charges of the first capacitor according to a first charge adjusting voltage e;
adjusting charges of the second capacitor according to the first charge adjusting voltage; and
generating a target current based on a difference between a first voltage provided by the first capacitor and a second voltage provided by the second capacitor.

19. The current generating method of claim 18, further comprising:
- coupling a first terminal of the first capacitor to the first charge adjusting voltage in a first mode;
- coupling the first terminal of the first capacitor to a second charge adjusting voltage in a second mode;
- coupling a first terminal of the second capacitor to the first charge adjusting voltage in the first mode; and
- not coupling the first terminal of the second capacitor to the second charge adjusting voltage in the second mode.

20. The current generating method of claim 19, further comprising:
- coupling the first terminal of the second capacitor to the second charge adjusting voltage in the first mode; and
- coupling the first terminal of the second capacitor to the first charge adjusting voltage in the second mode.

21. The current generating method of claim 19,
- wherein the current generating circuit comprises a current generating transistor, wherein the current generating transistor comprises a first terminal coupled to the second terminal of the second capacitor, and comprises a second terminal coupled to the second terminal of the first capacitor;
- wherein the current generating method further comprises:
- controlling a current generating transistor to be non-active in a fourth mode;
- coupling the first terminal of the first capacitor to the second charge adjusting voltage in the fourth mode; and
- not coupling the first terminal of the second capacitor to the second charge adjusting voltage in the fourth mode.

* * * * *